United States Patent [19]

Rice

[11] Patent Number: 4,534,335

[45] Date of Patent: Aug. 13, 1985

[54] SOLAR HEAT COLLECTOR AND REFLECTOR

[76] Inventor: Frederick H. Rice, P.O. Box 643, La Quinta, Calif. 92253

[21] Appl. No.: 519,019

[22] Filed: Aug. 1, 1983

[51] Int. Cl.³ .............................................. F24J 3/02
[52] U.S. Cl. ................................... 126/429; 126/440; 126/444; 136/248; 136/246
[58] Field of Search ............... 126/419, 424, 429, 439, 126/440, 432, 444, 446; 136/246, 260, 265, 259, 248; 165/172, 173

[56] References Cited

U.S. PATENT DOCUMENTS

| | | | |
|---|---|---|---|
| 3,012,294 | 12/1961 | Waldor | 126/429 X |
| 4,054,125 | 10/1977 | Eckels | 126/440 |
| 4,069,812 | 1/1978 | O'Neill | 126/439 X |
| 4,143,640 | 3/1979 | Pierce | 126/424 |
| 4,335,266 | 6/1982 | Mickelsen et al. | 136/260 |
| 4,378,786 | 4/1983 | Comeau, Jr. | 126/429 |

FOREIGN PATENT DOCUMENTS 2420085 11/1979 France .................. 126/440

Primary Examiner—Randall L. Green
Attorney, Agent, or Firm—Charles H. Thomas

[57] ABSTRACT

Disclosed herein is a solar heat collector and reflector which is placed across an open window area for selectively heating and insulating the interior of a dwelling place or the like. The collector includes a plurality of hollow fins, transversely disposed across the window area. One end of the fin communicates with a warm air reservoir, the other end with a cool air inlet. Each hollow fin is provided with an energy absorbant side of the fins with respect to the sun's rays, the air within each fin is heated and directed to the warm air reservoir causing cold air to be drawn into the hollow fins through the cool air inlet. The heated air is dispersed into the interior of building by use of a solar powered fan. Reversal of the orientation of the fins causes incoming rays to be reflected. Thus insulating the interior of the building from a hostile outside environment.

5 Claims, 6 Drawing Figures

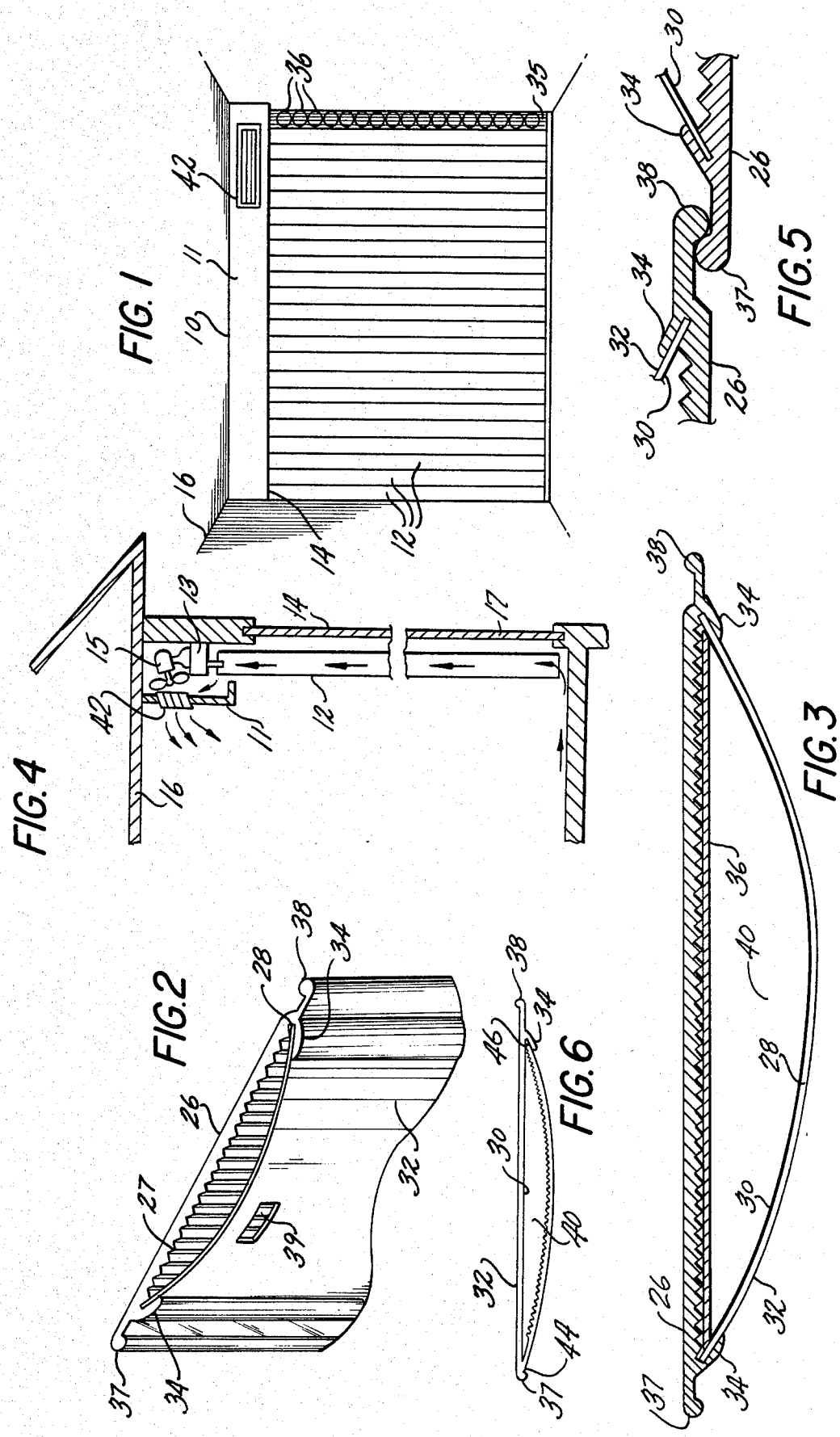

SOLAR HEAT COLLECTOR AND REFLECTOR

BACKGROUND OF THE INVENTION

In recent years considerable attention has been focused on energy conservation. One of the channels of such attention has been in the area of solar energy and several devices have been constructed in an effort to heat homes through the use of solar energy. Typically, such devices include large solar collectors comprised of one or more fluid conduits which undergo sinuous paths over an energy absorbing surface. Such devices are often impractical due to the necessary size of the collector and the supporting mechanism which faces the collector toward the sun and the expense involved in constructing such a system. Other systems incorporate a parabolic tracking dish to act as a collector, a high intensity storage device and a heat exchanger. Such systems are also quite bulky and costly. It would be highly desirable to provide a solar heat collector and reflector which was both relatively compact and inexpensive yet efficient and aesthetically attractive. The device hereinafter to be described fulfills the requirements while additionally providing a heat insulated viewing window for the home.

SUMMARY OF THE INVENTION

Briefly, the invention comprises a solar heating apparatus which is particularly adapted for heating the interior of a building or home while providing a heat insulated window therefore. The apparatus is comprised of a plurality of fins disposed across an open window area. One side of each of the fins is energy absorbent while the other is reflective to selectively generate heat within the defined which is then conveyed into the room or to reflect undesired heat. A reservoir is provided to collect the concentrated heated air. It is disposed into the interior of the building by a fan powered by photovoltaic solar cells located in one of the series of fins. Means are provided for reversing the orientation between the heat absorbing and heat reflective disposition and, when desired, for varying the angular orientation of the fins to follow the movement of the sun and thereby obtain a maximum heating efficiency.

It is the principal object of the present invention to provide a compact solar heating apparatus for selectively heating the interior of a dwelling place or the like.

It is another object of the present invention to provide solar heating apparatus for a dwelling place or the like which combines the solar heater with a heat insulated window.

It is a further object of the present invention to provide a solar heating apparatus which is disposed across the window area and in certain embodiments can be readily withdrawn from sight to provide an unobstructed view through the window area.

It is a still further object of the present invention to provide a solar heating and reflecting apparatus for a dwelling place or the like which is both aesthetically attractive and highly efficient.

It is another object of the present invention to provide a solar heating and reflecting apparatus for a dwelling place or the like which is a simple construction and economical to manufacture.

It is still a further object of the present invention to provide a solar heating and reflecting apparatus for a dwelling place or the like which eliminates undesirable heating caused by a greenhouse effect.

It is yet another object of the present invention to provide a solar heating and reflecting apparatus for dwelling places or the like which is adjustable to reflect the sun's rays.

These and other objects and advantages of the present invention will become apparent from the following detailed description taken in conjunction with the accompanying drawings.

IN THE DRAWINGS

FIG. 1 is a front view of the solar heating and reflective apparatus mounted across a window opening in a home with the solar photovoltaic louver panel shown below the heat dispersing grille.

FIG. 2 is a partial perspective view of the top of a louver illustrating the two piece assembly and slot for hanging louver.

FIG. 3 is an enlarged cross sectional view of the transparent sawtooth glazing, solar cell and curved metallic fin.

FIG. 4 is a side view of the window area illustrating the air movement means, the heat collecting reservoir, solar powered fan and grille.

FIG. 5 is an enlarged partial cross sectional view of the beaded edges of the transparent plastic glazings illustrating interlocking feature.

FIG. 6 is a cross sectional view of the one piece plastic fin which integral hinge, glazing, absorbing and reflecting surfaces.

DESCRIPTION OF THE PREFERRED EMBODIMENTS

Referring now in detail to the drawings, the solar heating apparatus 10 is comprised of a plurality of adjustable fins 12 which are transversely disposed across a window area 14 of a room 16 in a home or the like. Each fin 12 is formed of a pair of panels 26 and 28. Each panel 28 is formed of metal and has an energy absorbent side 30 which is covered with a dark highly absorbent material, preferably one which is additionally low in energy emission. Several matte black velvet paints are suitable for such purposes as well as various plating processes such as black chrome or black nickel chrome which have the additional benefit of reduced energy emission. The other side 32 of each metallic panel 28 is highly reflective and. Each of the fins 12 is carried by an adjusting and gathering assembly 13 similar to that used on standard vertical louver blinds. The vertical louver adjusting and gathering assembly 13 enables the fins 12 to be disposed in any desired angular orientation across the window area 14 with either side thereof facing the sun to absorb or reflect the sun's rays or, alternatively, removed to the side of the window area 14 to provide an unobstructed view through the transparent pane 17 across the window area 14, see FIG. 4.

One panel of each fin 12 is constructed of an elongated plastic glazing 26 with a pair of inwardly facing lips 34 on the lengthwise edges of plastic thereof. The other panel in each fin 12 is a somewhat resilient metallic panel 28 having an inner radiation absorbing surface 30 with a high absorptivity and a low emissivity characteristic and an outer reflective surface 32 with a high specularity, see FIG. 3. The lengthwise edges of the second metallic panel 28 fit within the slotted recesses made by the lips 34 of the first panel formed by the glazing 26, and the other or second metallic panel 28 is sprung slightly outwardly from the plastic glazing 26 locking it in place by spring pressure. The fin 12 becomes very stable and rigid when assembled.

The plastic glazing 26 has a sawtoothed surface 27 which diffuses the incoming sun radiation over the absorbing surface 30 of the metallic panel 28 as the fin 12 is oriented toward the sun's rays. The sawtooth configuration 27 is also specifically designed to obscure the black absorbing surface 30 of the metallic panel 28, see FIG. 2. The lineal design provides an aesthetically attractive appearance to the solar heat collecting side 26 of the fin 12 while the other reflective side 32 of the metallic panel 28 is very attractive with its mirrored surface. The sawtooth design 27 also tends to disguise the solar photovoltaic cells 36 that are assembled between the plastic glazing 26 and the metallic panel 28, see FIG. 3.

Each fin 12 when assembled has a small chimney flue air space 40 between the plastic glazing 26 and absorbing surface 30 of the metallic panel 28. When the sun's rays enter through the plastic glazing 26 and are absorbed by the selective coated surface 30 of the metalic panel 28, the plastic glazing 26 creates a greenhouse effect which traps the solar radiation which in turn creates a rising current of heated air; pulling cold air into the air space 40 opening at the bottom of each louver or fin 12, see FIG. 4 for air movement. As the heated air rises by natural convection, it becomes more compressed. The solar heated air exits at the top of each movable fin 12. A valance 11 which covers the area between the top of all the movable fins 12, and the ceiling acts as a heat reservoir. The concentrated heated air is directed into the room 16 by the use of a low voltage electric fan 15 powered by a solar photovoltaic panel 36, located in the slave louver or fin 35, see FIG. 1. A slanted grille 42 directs the heated air from the ceiling to the floor area.

The solar heating and reflecting apparatus 10 when fully closed as shown in FIG. 1 acts as an insulated curtain during times of extreme outside temperatures. Each fin 12 interlocks with its adjacent fin 12 at their beaded edges, 37 and 38, see FIG. 5. The air space 40 within each fin 12 acts as an insulative thermal air blanket delaying infiltration of unwanted temperatures. The novel interlocking beaded edges 37 and 38 help to align each fin 12 to seal off any open space between the fins 12 thus assuring a continuous curtain across the open window area 14.

The fins 12 are used with standard louver hardware 13 that permit them to be revolved in a 180° turning radius providing either the solar heat collector or the heat reflective capabilities.

Another embodiment of the invention is that the fin 12 can be a one piece plastic or like material extrusion. The fin 12 would be extruded in a flat configuration so that the heat absorbing selective layer could be applied to the flat surface in an assembly line fashion with either a selective paint or a thin black heat absorbing foil with an adhesive backing. On the opposite side of the flat surface, a highly reflective mirrored surface can be applied by using the vacuum process or a mirrored foil with an adhesive backing. When both the heat absorbing layer 30 and the reflective layer 32 is applied to the flat surface of the fin 12, the plastic glazing is turned back on the flat surface by means of an integral hinge 44, see FIG. 6. The plastic glazing with the sawtooth surface is sprung outwardly by a slight pressure and the lengthwise edge 46 is locked into the slotted lip 34 by spring pressure. The plastic glazing assumes a slight convex arc. The assembled fin 12 has a small air space 40 between the plastic glazing and the absorbing surface 30 allowing the solar heat collection in the air space 40 when the plastic glazing side of the fin 12 is facing the sun's rays. Notice that in the one piece extrusion the plastic glazing forms the slight convex arc rather than the metallic fin 32.

Still another embodiment of the same invention is that both the heat absorbing layer 30 and the photovoltaic panel 36 are one and the same. By applying a thin film, photovoltaic process such as copper indium diselenide ($CuInSe_2$) to the absorbing surface 30 by a vacuum evaporation method, a low cost photovoltaic device can be obtained with excellent mass production possibilities. The photovoltaic layer serves also as the heat absorbing surface. The plastic glazing also serves as a protective cover to prevent contamination of the photovoltaic and heat absorbing surface.

Another embodiment of the invention is where there is a series of slave fins 35 which incorporate a series of photovoltaic panels 36 so that substantial electrical energy can be generated to operate other low voltage electrical appliances such as ceiling fans, security systems, clocks, low voltage lighting and any solid state equipment. At the same time it also supplies heated air to the room. The electrical energy generated during the sunshine hours can be stored in a battery pack that can be concealed behind the valance 11. A simple electric switch can be installed to turn off the electric fan that disperses the heated air if the occupant wants electrical energy only.

Various changes and modifications may be made in carrying out the present invention without departing from the spirit and scope thereof. In so far as these changes and modifications are within the purview of the appended claims they are to be considered part of the invention.

I claim:

1. A solar heat collector and reflector system adapted to be disposed across an open window area in a room, said system comprising a series of fins all mounted for rotational movement through an arc of 180 degrees about parallel axes each fin being formed of a pair of first and second panels, one of which panels is a plastic glazing having an inner radiation diffusing, sawtooth surface which diffuses light passing therethrough, and the other of which panels has an outer reflective surface and an inner radiation absorbing surface facing said inner sawtooth surface of said plastic glazing, whereby said sawtooth surface obscures the view of said inner radiation absorbing surface while permitting light to reach said radiation absorbing surface, and said first of said panels in each pair is equipped with slotted lip means adapted to receive a lengthwise edge of said second panel to hold said second panel in a resiliently deformed condition flexed outwardly away from said first panel to define a chimney flue between said panels in each pair, and said lengthwise edge is held in said slotted lip means by spring pressure of said second panel, and the lengthwise edges of said first panel are both beaded and are adapted for mutual engagement to interlock with the beaded edges of the first panel of fins adjacent thereto to seal off any open space between adjacent fins, thereby providing a continuous curtain across said open window area when said fins are rotated to their extreme positions of rotation, means defining a heat reservoir located above said fins for collecting the accumulated heat from each fin, a fan located in said heat reservoir and powered by a photovoltaic panel which is located in a slave fin to disperse the concentrated heated air from said reservoir into the room, and means for collectively rotating said fins about their axes to vary the angular orientation of said fins toward the sun thereby regulating the solar heated hot air flow into the room from said heat reservoir.

2. A solar heat collector and reflector system according to claim 1 wherein said second panel in each fin is resilient and is formed of metal.

3. A solar heat collector and reflector system according to claim 1 wherein said fin panels are formed as parts of an integral one piece plastic extrusion.

4. A solar heat collector and reflector system according to claim 1 wherein said radiation absorbing surface is comprised of a film of copper indium diselenide ($CuInSe_2$) which serves as a thin film photovoltaic layer.

5. A solar heat collector and reflector system according to claim 1 further comprising a series of slave fins which are coated with a photovoltaic layer to serve as both solar heat absorbers and as electrical generating means.

* * * * *